United States Patent
Ono (10) Patent No.: US 10,234,310 B2
(45) Date of Patent: Mar. 19, 2019

(54) LIGHT-EMITTING UNIT, LIGHT-EMITTING AND LIGHT-RECEIVING UNIT AND PHOTOELECTRIC ENCODER

(71) Applicant: MITUTOYO CORPORATION, Kawasaki, Kanagawa (JP)

(72) Inventor: Kimitoshi Ono, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 170 days.

(21) Appl. No.: 15/601,333

(22) Filed: May 22, 2017

(65) Prior Publication Data

US 2017/0343388 A1    Nov. 30, 2017

(30) Foreign Application Priority Data

May 27, 2016   (JP) ................. 2016-105915

(51) Int. Cl.
*G01D 5/30*   (2006.01)
*G01D 5/347*  (2006.01)

(52) U.S. Cl.
CPC ......... *G01D 5/305* (2013.01); *G01D 5/34707* (2013.01); *G01D 5/34715* (2013.01)

(58) Field of Classification Search
CPC . G01D 5/305; G01D 5/34707; G01D 5/34715
See application file for complete search history.

(56) References Cited

U.S. PATENT DOCUMENTS 5,479,010 A     12/1995   Shimomura et al.
6,794,636 B1 *  9/2004    Cardillo ............ G01D 5/34715
                                                      250/227.11

FOREIGN PATENT DOCUMENTS

JP   07-151565    6/1995
JP   2003-106871  4/2003
JP   2011-059055  3/2011

\* cited by examiner

*Primary Examiner* — Tony Ko
(74) *Attorney, Agent, or Firm* — Rankin, Hill & Clark LLP (57) ABSTRACT

A light-emitting unit includes: a light source; and a reflector having reflection faces of first and second partial paraboloids, the first and second partial paraboloids being spaced from each other in an optical axis direction of the light source, the first and second partial paraboloids having a focal point on the light source, wherein: the second partial paraboloid is between the light source and the first partial paraboloid in the optical axis direction; the second partial paraboloid has a coefficient different from that of the first partial paraboloid; and the second partial paraboloid is positioned on a reflection direction side of a light from the light source reflected by the first partial paraboloid, with respect to a plane that is obtained on a presumption that the first partial paraboloid is extended to the light source side in accordance with the coefficient of the first partial paraboloid.

10 Claims, 10 Drawing Sheets

LIGHT-EMITTING UNIT, LIGHT-EMITTING AND LIGHT-RECEIVING UNIT AND PHOTOELECTRIC ENCODER

CROSS-REFERENCE TO RELATED APPLICATION

This application is based upon and claims the benefit of priority of the prior Japanese Patent Application No. 2016-105915, filed on May 27, 2016, the entire contents of which are incorporated herein by reference.

FIELD

A certain aspect of embodiments described herein relates to a light-emitting unit, a light-emitting and light-receiving unit and a photoelectric encoder.

BACKGROUND

Japanese Patent Application Publication No. 2011-059055 (hereinafter referred to as Document 1) discloses a photoelectric encoder that has a collimate lens and a both-side telecentric optical system. Japanese Patent Application Publication No. 07-151565 (hereinafter referred to as Document 2) discloses a photoelectric encoder that has an illumination system using a paraboloid mirror.

SUMMARY

Document 1 uses a collimate lens. Therefore, when a focal length is reduced in order to downsize the illumination system, degradation of illumination homogeneity, degradation of parallelism of light beam or the like may occur. And so, the technology of Document 2 may be used. However, when the technology of Document 2 is used for a photoelectric encoder having a plurality of tracks, it is necessary to enlarge a paraboloid so as to cover two tracks. In this case, downsizing of the illumination system is difficult.

According to an aspect of the present invention, there is provided a light-emitting unit including: a light source; and a reflector that has a reflection face of a first partial paraboloid and a reflection face of a second partial paraboloid, the first partial paraboloid and the second partial paraboloid being spaced from each other in an optical axis direction of the light source, the first partial paraboloid and the second partial paraboloid having a focal point on the light source, wherein: the second partial paraboloid is between the light source and the first partial paraboloid in the optical axis direction; the second partial paraboloid has a coefficient that is different from that of the first partial paraboloid; and the second partial paraboloid is positioned on a reflection direction side of a light from the light source that is reflected by the first partial paraboloid, with respect to a plane that is obtained on a presumption that the first partial paraboloid is extended to the light source side in accordance with the coefficient of the first partial paraboloid.

According to another aspect of the present invention, there is provided a light-emitting and light receiving unit including: the light emitting unit; a first light-receiving element that receives a light from the first partial paraboloid; and a second light-receiving element that receives a light from the second partial paraboloid.

According to another aspect of the present invention, there is provided a photoelectric encoder including: the light-emitting and light receiving unit; a first track that has optical grids along a measurement axis, relatively moves with respect to the light-emitting and light-receiving unit, and transmits a light from the first partial paraboloid; and a second track that has optical grids along the measurement axis, relatively moves with respect to the light-emitting and light-receiving unit, and transmits a light from the second partial paraboloid, wherein: the first light-receiving element is arranged so as to receive a light passing through the first track; and the second light-receiving element is arranged so as to receive a light passing through the second track.

According to another aspect of the present invention, there is provided a light-emitting unit including: a first light source and a second light source; and a reflector that has a reflection face of a first partial paraboloid and a reflection face of a second partial paraboloid, the reflection face of the first partial paraboloid having a focal point on the first light source, the reflection face of the second partial paraboloid having a focal point on the second light source; wherein: the first partial paraboloid and the second partial paraboloid are spaced from each other in an optical axis direction of the first light source; the second partial paraboloid is between the first light source and the first partial paraboloid in the optical axis direction of the first light source; the second partial paraboloid has a coefficient that is different from that of the first partial paraboloid; and the second partial paraboloid is positioned on a reflection direction of a light from the first light source that is reflected by the first partial paraboloid, with respect to a plane that is obtained on a presumption that the first partial paraboloid is extended to the first light source side in accordance with the coefficient of the first partial paraboloid.

DESCRIPTION OF EMBODIMENTS

The following is a description of embodiments, with reference to the accompanying drawings.

First Embodiment

Figure 1A:
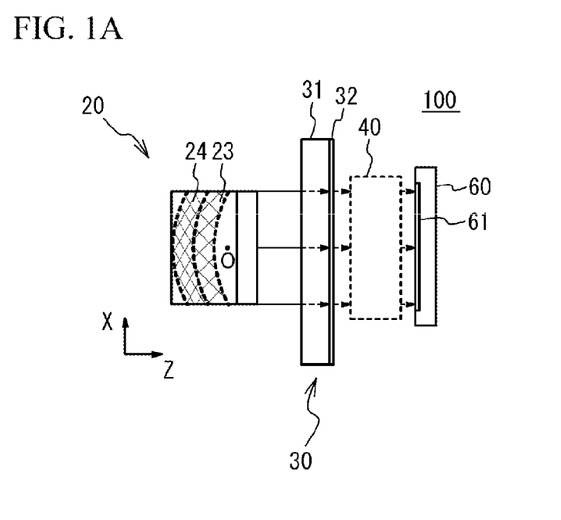
FIG. 1A illustrates a plan view of a photoelectric encoder in accordance with a first embodiment.
Figure 1B:
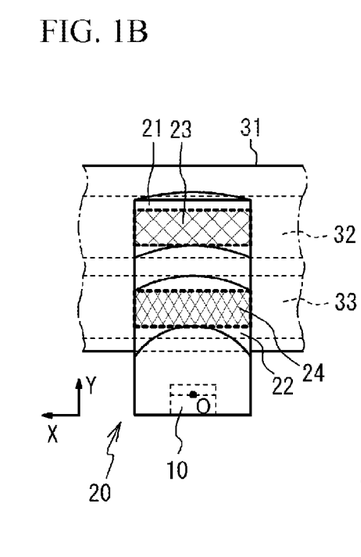
FIG. 1B illustrates a side view of the photoelectric encoder.
Figure 1C:
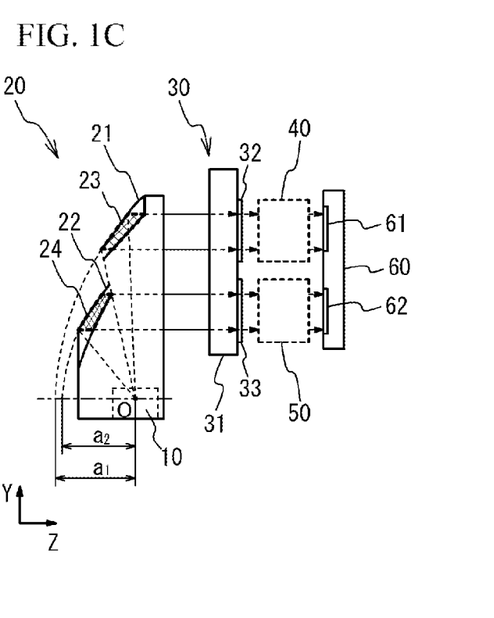
FIG. 1C illustrates a front view of the photoelectric encoder.
Figure 2:
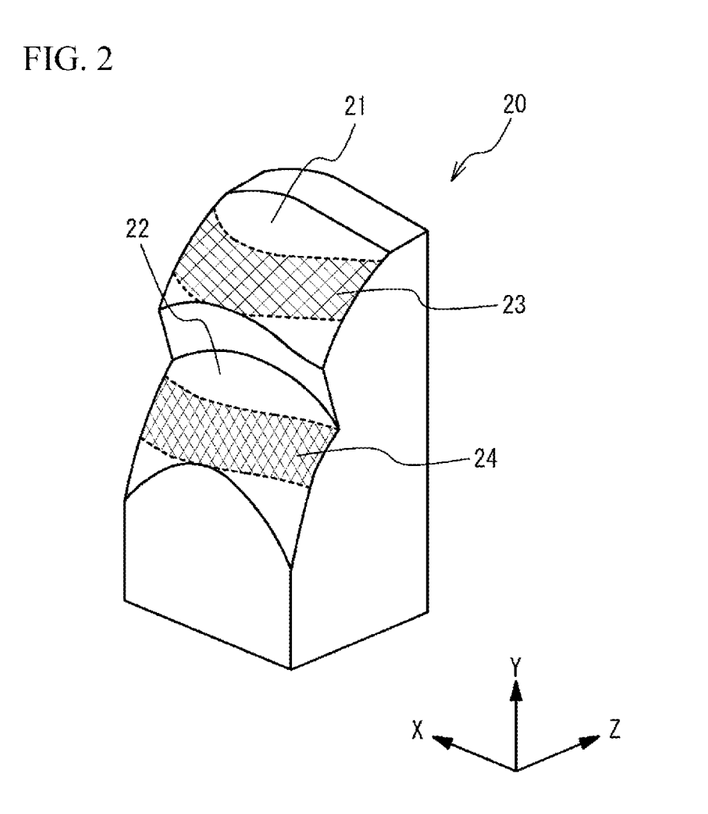
FIG. 2 illustrates a perspective view of a reflector.

FIG. 1A illustrates a plan view of a photoelectric encoder 100 in accordance with a first embodiment. FIG. 1B illustrates a side view of the photoelectric encoder 100. FIG. 1C illustrates a front view of the photoelectric encoder 100. FIG. 2 illustrates a perspective view of a reflector 20 described later. In the following description, an array direction of each optical grid formed in a scale 30 described later is an X-axis. An optical axis direction of a light source 10 described later is a Y-axis. A direction vertical to the X-axis and the Y-axis is a Z-axis. The Z-axis corresponds to a direction of an output light of the light source 10 that is reflected by the reflector 20.

As illustrated in FIG. 1A to FIG. 1C, the photoelectric encoder 100 includes the light source 10, the reflector 20, the scale 30, a first optical detector 40, a second optical detector 50 and a light-receiving element 60.

The light source 10 is a point light-emitting element such as a photodiode. As described above, the light source 10 has an optical axis in the Y-axis direction, and emits a light to a plus side of the Y-axis direction. The light source 10 is arranged in a recess formed on a bottom face of the reflector 20.

The reflector 20 is a concave mirror that has a plurality of different partial paraboloids for converting an emitted light of the light source 10 into a collimated light. As illustrated in FIG. 1B, FIG. 1C and FIG. 2, in the embodiment, the reflector 20 has a first partial paraboloid 21 and a second partial paraboloid 22 that are spaced from each other in the Y-axis direction and have a different coefficient. The second partial paraboloid 22 is positioned between the light source 10 and the first partial paraboloid 21 in the Y-axis direction. The second partial paraboloid 22 is positioned on the plus side of the Z-axis with respect to a plane that is obtained on a presumption that the first partial paraboloid 21 is extended to the light source 10 side (the minus side of the Y-axis) in accordance with the coefficient of the first partial paraboloid 21. The coefficients of the first partial paraboloid 21 and the second partial paraboloid 22 are determined so that a focal point O of the first partial paraboloid 21 and the second partial paraboloid 22 is positioned at a light-emitting point of the light source 10. Thus, an internal face of the first partial paraboloid 21 and an internal face of the second partial paraboloid 22 reflect the emitted light of the light source 10 and convert the emitted light into collimated lights. Details of the first partial paraboloid 21 and the second partial paraboloid 22 will be described later.

The scale 30 includes a transparent body 31 and a plurality of tracks. The number of the tracks is the same as the number of the partial paraboloids of the reflector 20. Therefore, in the embodiment, the scale 30 has two tracks, a first track 32 and a second track 33. The first track 32 is arranged on an optical path of the collimated light from the first partial paraboloid 21. The second track 33 is arranged on an optical path of the collimated light from the second partial paraboloid 22.

The first track 32 and the second track 33 have optical grids at a predetermined scale period along the X-axis direction. That is, the first track 32 and the second track 33 have an array direction of the optical grids in the X-axis direction. The first track 32 and the second track 33 are spaced from each other in the Y-axis direction. The scale period of the first track 32 may be the same as that of the second track 33. The scale period of the first track 32 may be different from that of the second track 33. For example, one of the tracks may be an incremental track having an incremental pattern of brightness and darkness at an equal interval. And, the other may be an absolute track having an absolute pattern expressing pseudo random codes. One of the tracks may be a rough pattern. And the other may be a fine pattern. The first track 32 and the second track 33 may have the same pattern grid of which phase is different from each other. For example, each of the first track 32 and the second track 33 may be an incremental pattern having a different phase by 90 degrees. The output of the light receiving element 60 may be a two-phase sinusoidal wave signal or a two-phase rectangular signal.

The first optical detector 40 is arranged on an optical path of the collimated light passing through the first track 32. The second optical detector 50 is arranged on an optical path of the collimated light passing through the second track 33. The collimated light passing through the first track 32 has brightness and darkness caused by the optical grids of the first track 32 and enters the first optical detector 40. The collimated light passing through the second track 33 has brightness and darkness caused by the optical grids of the second track 33 and enters the second optical detector 50.

Figure 3:
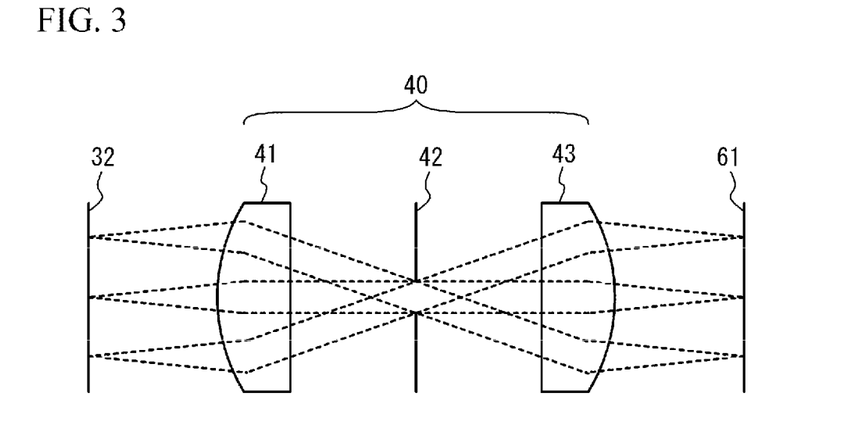
FIG. 3 illustrates an optical detector.

The first optical detector 40 and the second optical detector 50 forms an image of the collimated lights on the light-receiving element 60. The first optical detector 40 and the second optical detector 50 may be a both-side telecentric optical system or a lens mirror array. FIG. 3 illustrates the first optical detector 40. In FIG. 3, the both-side telecentric optical system is illustrated. As illustrated in FIG. 3, the first optical detector 40 has a structure in which a first imaging lens 41, an aperture board 42 and a second imaging lens 43 are arranged in this order in an optical path direction. A diffracted light passing through the first track 32 passes through the first imaging lens 41, passes through an aperture of the aperture board 42, is condensed by the second imaging lens 43 and focused on the light receiving element 60. The second optical detector 50 has the same structure as the first optical detector 40.

The light-receiving element 60 is such as a photodiode array. The light-receiving element 60 has a plurality of light-receiving regions. The number of the light-receiving regions is the same as the number of the partial paraboloids of the reflector 20. In the embodiment, therefore, the light-receiving element 60 has two light-receiving regions, a first light-receiving region 61 and a second light-receiving region 62. In each of the first light-receiving region 61 and the second light-receiving region 62, a plurality of photodiodes are arrayed in the X-axis direction at a predetermined periodical interval.

The first optical detector 40 forms an image of the collimated light passing through the first track 32 on the first light-receiving region 61 of the light-receiving element 60. The second optical detector 50 forms an image of the collimated light passing through the second track 33 on the second light-receiving region 62 of the light-receiving element 60. The first light-receiving region 61 uses outputs of a plurality of photodiodes and detects brightness and darkness according to the optical grids of the first track 32. The second light-receiving region 62 uses outputs of a plurality of photodiodes and detects brightness and darkness according to the optical grids of the second track 33. It is therefore possible to detect a relative position fluctuation between the scale 30 and the light-receiving element 60. In concrete, it is possible to calculate a position fluctuation amount, on the basis of optical intensity detected by the plurality of photodiodes.

Next, a description will be given of details of the first partial paraboloid 21 and the second partial paraboloid 22 of the reflector 20. The first partial paraboloid 21 and the second partial paraboloid 22 have the focal point in common. The first partial paraboloid 21 is a part of a rotary paraboloid. The second partial paraboloid 22 is a part of another rotary paraboloid. The coefficient of the rotary paraboloid of the first partial paraboloid 21 is different from that of the second partial paraboloid 22. An i-th partial paraboloid may be expressed by the following formula (1) with respect to the focal point O as an origin. "$a_i$" is a coefficient. As illustrated in FIG. 1C, "$a_i$" is a distance in the minus direction of the Z-axis between each partial paraboloid extended to the minus side of the Y-axis direction and the focal point O. As described above, the light emission direction of the collimated light emitted from each partial paraboloid is the plus direction of the Z-axis. A coefficient "$a_2$" of the second partial paraboloid is smaller than a coefficient "$a_1$" of the first partial paraboloid. "$a_i$" is a value satisfying $a_i$>0.

$$z_i + a_i = (x_i^2 + y_i^2)/4a_i \quad (1)$$

The paraboloid expressed by the formula (1) has a shape perfectly achieving parallel light with respect to an ideal spherical wave having the focal point O as an origin. However, when a light source device is located at the focal point (for example, an LED package component is jointed to a reflector component), an optical refraction occurs at an interface of medium having a different refraction index or at an interface of air between the light source device and the reflector. Therefore, an aberration from the ideal spherical wave occurs at a wave front emitted by the light source. And, a parallelism of a reflected light may be degraded. The aberration is determined by a structure from the light source to the paraboloid. It is therefore possible to improve the parallelism by adding a correction term as the following formula (2) and canceling the aberration.

$$z_i + a_i = (x_i^2 + y_i^2)/4a_i + c_i(x,y) \quad (2)$$

$c_i(x,y)$ is an arbitrary correction term that is added in accordance with a coordinate on the partial paraboloid. As a design method of the aberration term, the correction term may be expressed by a high order multinomial function of x and y, and a coefficient may be designed optimally.

The reflector 20 is made of a transparent material. For example, the reflector 20 is an optical resin. A formation method of the reflector 20 is not limited. It is, for example, possible to form the reflector 20 by a resin injection molding. A reflection film having a high reflectivity is formed on outer faces of the first partial paraboloid 21 and the second partial paraboloid 22. For example, the reflection film having the high reflectivity may be a metal vapor deposition film (aluminum or the like), a dielectric multi-layer film, or the like.

A part of the first partial paraboloid 21 that enters the emitted light of the light source 10 into the first light-receiving region 61 of the light-receiving element 60 is hereinafter referred to as a first effective region 23. A part of the second partial paraboloid 22 that enters the emitted light of the light source 10 into the second light-receiving region 62 of the light-receiving element 60 is hereinafter referred to as a second effective region 24. Each coefficient of the first partial paraboloid 21 and the second partial paraboloid 22 is selected so that the collimated light from the first effective region 23 and the collimated light from the second effective region 24 do not obstruct each other.

Figure 4A:
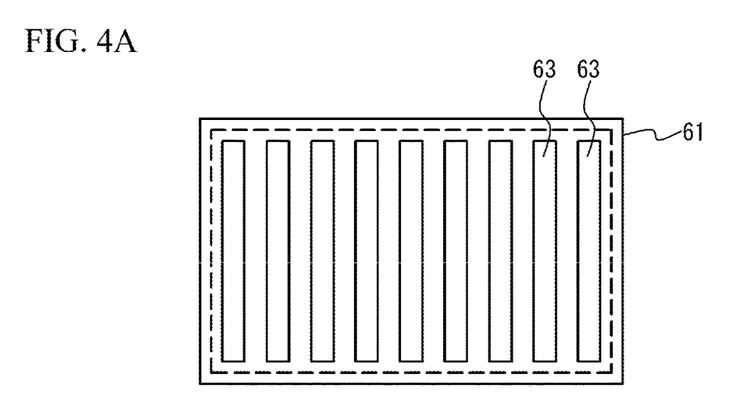
FIG. 4A to FIG. 4C illustrate a light-receiving region.
Figure 4B:
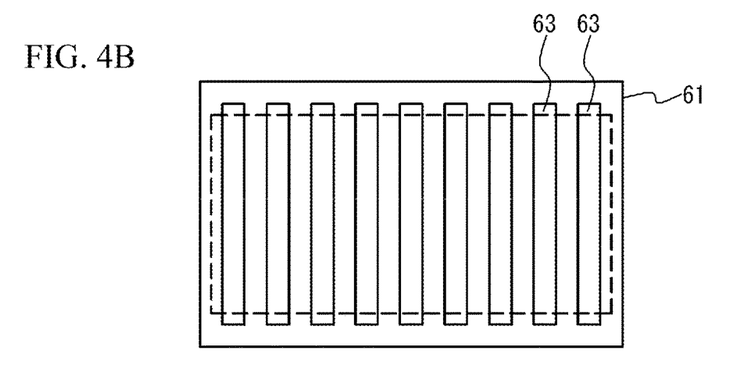
Figure 4C:
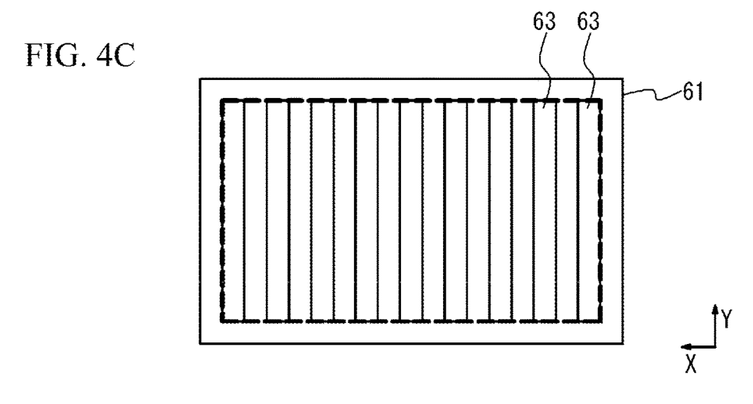

FIG. 4A to FIG. 4C illustrate the first light-receiving region 61. As illustrated in FIG. 4A, in the first light-receiving region 61, a plurality of light-receiving elements 63 are spaced from each other and are arrayed at a predetermined interval in the X-axis direction. The first effective region 23 is designed so as to cover all of the light-receiving elements 63 in the first partial paraboloid 21 as indicated by a dotted line of FIG. 4A. In another case, the first effective region 23 covers all of the light-receiving elements 63 in the first partial paraboloid 21 in the X-axis direction as indicated by a dotted line of FIG. 4B. And, there may be a case where the first effective region 23 does not cover a part of each light-receiving element 63 in the Y-axis direction. The second effective region 24 forms the same region with respect to the second light-receiving region 62. In the example of FIG. 1A to FIG. 1C, as illustrated in FIG. 4C, the first effective region 23 corresponds to the region determined by the light-receiving region (region obtained by connecting outlines of all of the light-receiving elements 63) and a magnification of the first optical detector 40 (the same magnification in FIG. 1A to FIG. 1C).

Comparative Embodiment

Figure 5A:
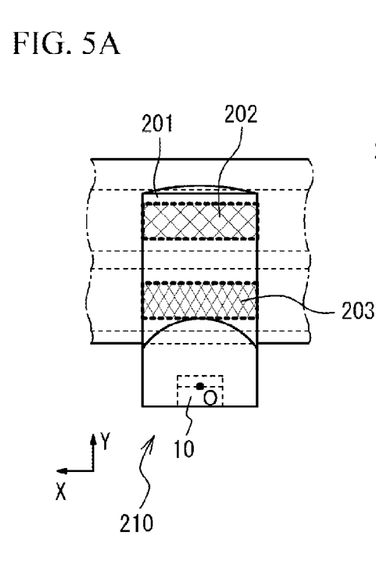
FIG. 5A illustrates a side view of a photoelectric encoder in accordance with a comparative embodiment.
Figure 5B:
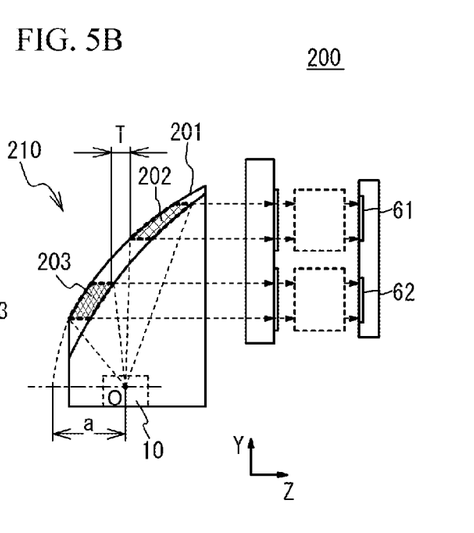
FIG. 5B illustrates a front view of the photoelectric encoder.

A description will be given of a photoelectric encoder 200 in accordance with a comparative embodiment in order to describe an effect of the photoelectric encoder 100 in accordance with the first embodiment. FIG. 5A illustrates a side view of the photoelectric encoder 200. FIG. 5B illustrates a front view of the photoelectric encoder 200. The photoelectric encoder 200 is different from the photoelectric encoder 100 in a point that a reflector 210 is provided instead of the reflector 20.

As illustrated in FIG. 5A and FIG. 5B, one partial paraboloid 201 is formed in the reflector 210. The coefficient of the formula (1) is "a" (>0). A first effective region 202 and a second effective region 203 are included in the partial paraboloid 201. The first effective region 202 is a region of the partial paraboloid 201 and is a region for entering the emitted light of the light source 10 into the first light-receiving region 61. The second effective region 203 is a part of the partial paraboloid 201 and is a region for entering the emitted light of the light source 10 into the second light-receiving region 62. The first effective region 202 is spaced from the second effective region 203 in the Y-axis direction. A description will be given of a reason that the first effective region 202 is spaced from the second effective region 203 in the Y-axis direction.

In the photoelectric encoder having two different tracks, it is possible to detect a wholly high-accuracy absolute position by combining high accuracy position information obtained by equally spaced grid track and track information storing absolute position information. These tracks are arranged in a direction (Y-axis direction) vertical to a measurement direction. In the photoelectric encoder, a track has a height in the vertical direction (Y-axis direction). This is because, the track has to have a height larger than that of a light-receiving region so that a mutual deviation in a height direction caused by assembling of components or movement of a detector in addition to a height of a light-receiving region of a light-receiving element (a photodiode array formed on an IC) is allowed.

Two different tracks are adjacently arranged to each other. Therefore, when the tracks are close to each other, a possibility of light mixing (stray light) via a next track is increased. In this case, a risk of performance degradation such as noise is increased. Because of these reasons, it is demanded that two tracks having a reasonable height are arranged with a reasonable distance. As an example, it is preferable that the distance between the tracks is 3 mm. It is therefore necessary to space the first effective region 202 from the second effective region 203 in the Y-axis direction.

When one partial paraboloid has the first effective region 202 and the second effective region 203, it is necessary to space the first effective region 202 from the second effective region 203 in the Y-axis direction. Therefore, the first effective region 202 is spaced from the second effective region 203 in the Z-axis direction. In FIG. 5B, it is possible to provide an excessive thickness T of the reflector 210 as a space distance. In this case, the reflector becomes thicker in the Z-axis direction. Thus, a downsizing of an illumination system having a light source and a reflector becomes difficult.

In contrast, in the photoelectric encoder 100 in accordance with the first embodiment, it is possible to eliminate an excessive thickness between the first effective region 23 and the second effective region 24, compared to a reflector using a single partial paraboloid. In concrete, it is possible to shift the second partial paraboloid 22 to the plus side of the Z-axis with respect to a plane that is obtained on a presumption that the first partial paraboloid 21 is extended to the minus side of the Y-axis direction in accordance with the coefficient of the first partial paraboloid 21. It is therefore possible to eliminate an excessive thickness of the reflector 20. Thus, it is possible to downsize the illumination system. And it is possible to radiate homogeneous parallel light to a range sufficiently covering the first effective region 23 and the second effective region 24. And when an internal reflection is used, contamination of a reflection face from outside is suppressed. It is possible to determine the position of the light source 10 with high accuracy and assemble the light source 10, because a reflection face and a recess for the light source 10 are formed in the same component.

Second Embodiment

Figure 6A:
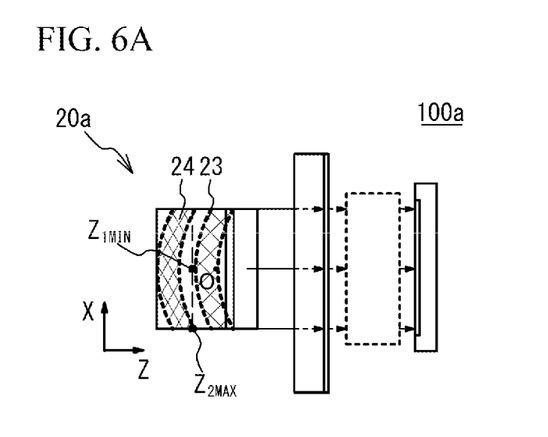
FIG. 6A illustrates a plan view of a photoelectric encoder in accordance with a second embodiment.
Figure 6B:
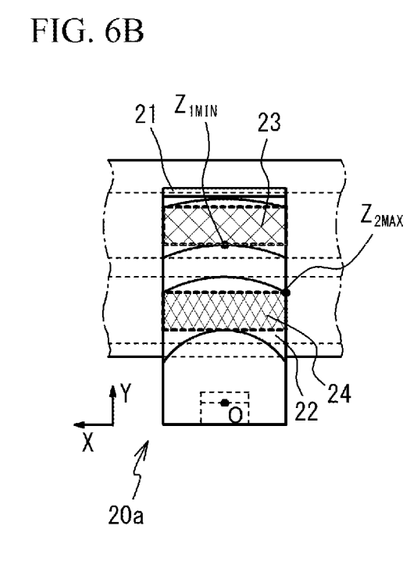
FIG. 6B illustrates a side view of the photoelectric encoder.
Figure 6C:
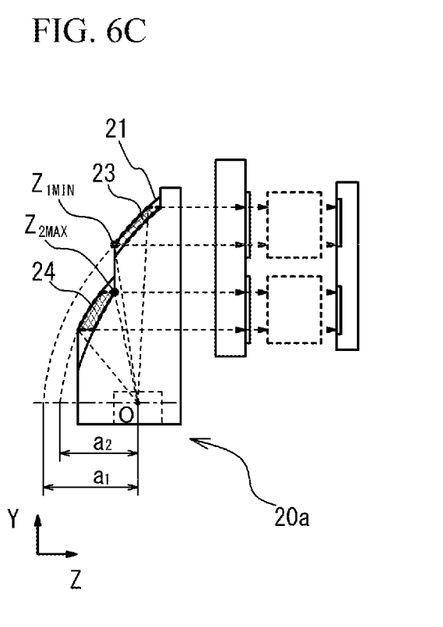
FIG. 6C illustrates a front view of the photoelectric encoder.
Figure 7:
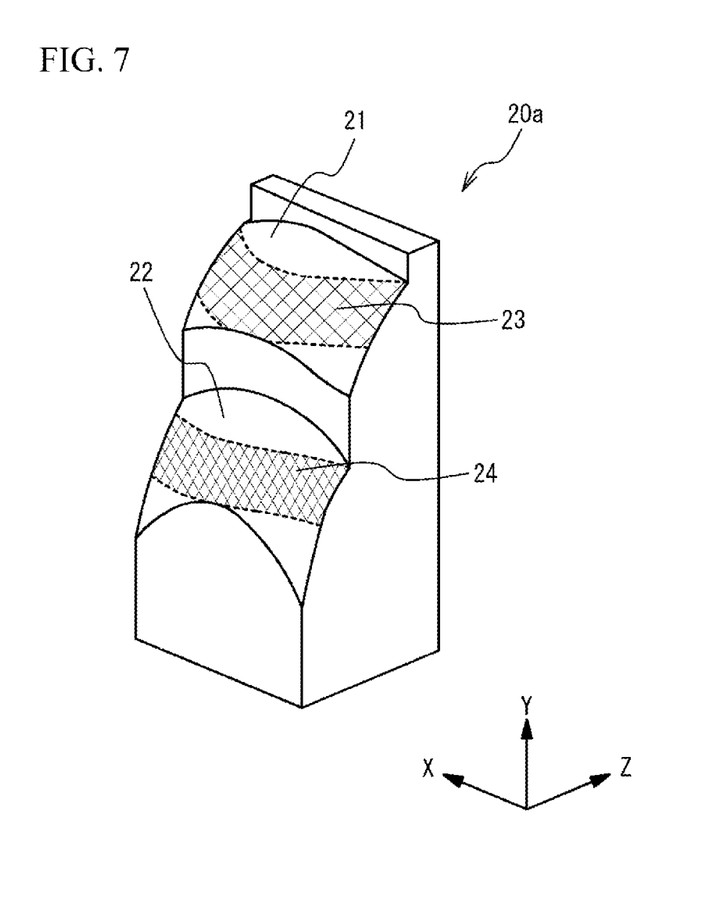
FIG. 7 illustrates a perspective view of a reflector in accordance with the second embodiment.

FIG. 6A illustrates a plan view of a photoelectric encoder 100a in accordance with a second embodiment. FIG. 6B illustrates a side view of the photoelectric encoder 100a. FIG. 6C illustrates a front view of the photoelectric encoder 100a. The photoelectric encoder 100a is different from the photoelectric encoder 100 in a point that a reflector 20a is provided instead of the reflector 20. FIG. 7 illustrates a perspective view of the reflector 20a.

The reflector 20a is different from the reflector 20 in a point that a shape of the reflector 20a is limited. As illustrated in FIG. 6A to FIG. 6C and FIG. 7, in the reflector 20a, the coefficient $a_1$ (>0) of the first partial paraboloid 21 and the coefficient $a_2$ (>0) of the second partial paraboloid 22 are determined so that a minimum Z coordinate $Z_{1MIN}$ of the first effective region 23 and a minimum Z coordinate $Z_{2MAX}$ of the second effective region 24 coincide with each other on a presumption that the first effective region 23 and the second effective region 24 are projected to the XZ plane.

In this structure, a back clearance of a tool becomes larger when a metal mold of the reflector 20a is processed by a lathe or the like. Therefore, a preferable effect of easy workability is achieved.

Third Embodiment

Figure 8A:
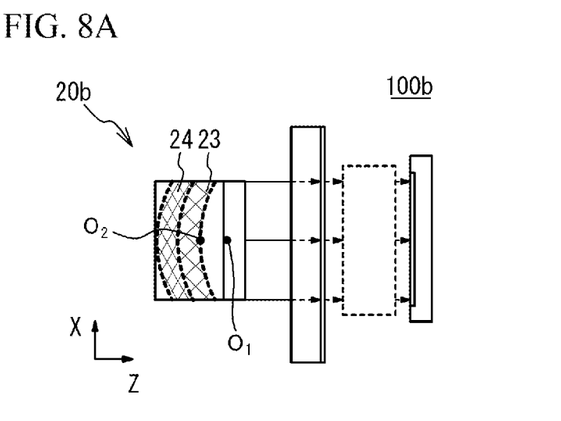
FIG. 8A illustrates a plan view of a photoelectric encoder in accordance with a third embodiment.
Figure 8B:
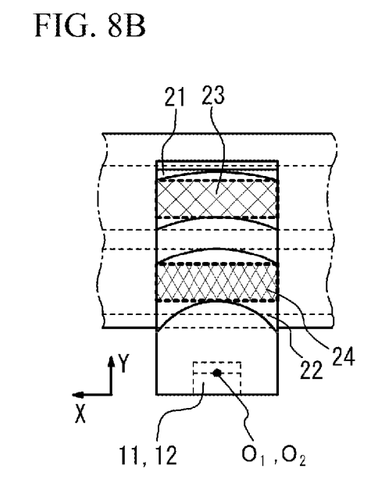
FIG. 8B illustrates a side view of the photoelectric encoder.
Figure 8C:
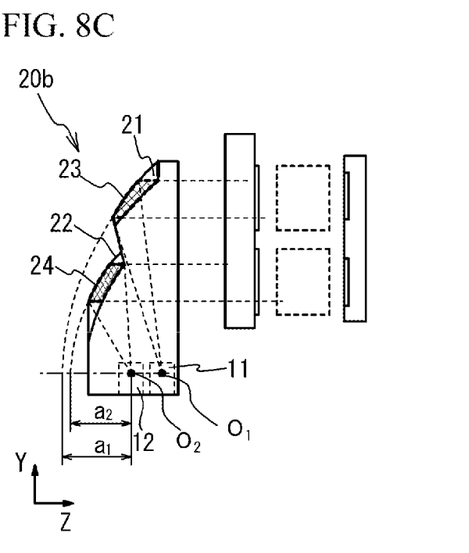
FIG. 8C illustrates a front view of the photoelectric encoder.

In the first embodiment and the second embodiment, the number of the light source is one. However, the number is not limited. For example, a plurality of light sources may be provided. FIG. 8A illustrates a plan view of a photoelectric encoder 100b in accordance with a third embodiment. FIG. 8B illustrates a side view of the photoelectric encoder 100b. FIG. 8C illustrates a front view of the photoelectric encoder 100b.

In the photoelectric encoder 100b, a reflector 20b is provided instead of the reflector 20. As illustrated in FIG. 8A to FIG. 8C, the reflector 20b has the first partial paraboloid 21 and the second partial paraboloid 22 that are provided in the Y-axis direction and are spaced from each other, as well as the first embodiment and the second embodiment. The second partial paraboloid 22 is positioned between a first light source 11 and the first partial paraboloid 21 in the Y-axis direction. The second partial paraboloid 22 is positioned on the plus side of the Z-axis with respect to a plane that is obtained on a presumption that the first partial paraboloid 21 is extended to the first light source 11 side (the minus side of the Y-axis) in accordance with the coefficient of the first partial paraboloid 21.

For example, the first light source 11 and a second light source 12 may be provided at different two positions in the Z-axis direction. The first light source 11 and the second light source 12 are respectively provided in two recesses formed on the bottom face of the reflector 20b. The coefficient of the first partial paraboloid 21 is determined so that a first focal point O1 of the first partial paraboloid 21 is positioned at an emission point of the first light source 11. The coefficient of the second partial paraboloid 22 is determined so that a second focal point O2 of the second partial paraboloid 22 is positioned at an emission point of the second light source 12.

XYZ axes with respect to the first focal point $O_1$ of the first partial paraboloid 21 as an origin are $X_1Y_1Z_1$ axes. XYZ axes with respect to the second focal point $O_2$ of the second partial paraboloid 22 as an origin are $X_2Y_2Z_2$ axes. In this case, the $X_1$ axis, the $Y_1$ axis and the $Z_1$ axis are respectively in parallel with the $X_2$ axis, the $Y_2$ axis and the $Z_2$ axis. However, the $X_1$ axis, the $Y_1$ axis and the $Z_1$ axis may be respectively off from the $X_2$ axis, the $Y_2$ axis and the $Z_2$ axis. That is, the plurality of light sources may be located at any positions, when the first partial paraboloid 21 and the second partial paraboloid 22 that are different from each other are provided at two different positions of the Y-axis direction and spaced from each other, the second partial paraboloid 22 is between the first light source 11 and the first partial paraboloid 21 in the Y-axis direction, the second partial paraboloid 22 is positioned on the plus side of the Z-axis with respect to a plane that is obtained on a presumption that the first partial paraboloid 21 is extended to the first light source 11 side (the minus side of the Y-axis) in accordance with the coefficient of the first partial paraboloid 21.

Figure 9A:
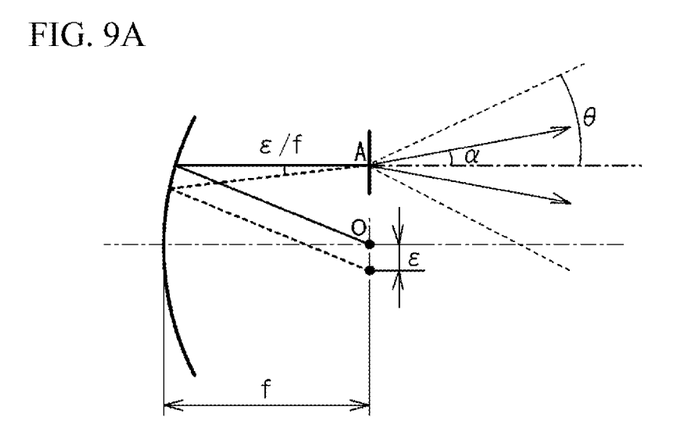
FIG. 9A and FIG. 9B illustrate an allowable range of a positional deviation between a focal point of a paraboloid and a light source.

Next, a description will be given of an allowable range of the positional deviation between the focal point of the partial paraboloid and the light source. FIG. 9A illustrates a schematic view including the partial paraboloid, the focal point (focal point O) of the light source, and the position of the track (substance A). As illustrated in FIG. 9A, a light beam emitted from the focal point O is reflected by the partial paraboloid and reaches the substance A. After that, a transmitted light is introduced into the optical detector having a light-introducing angle plus minus "θ" and is forms an image.

Two light beams indicated with an angle plus minus "α" correspond to first order diffracted lights ($\alpha = \sin^{-1}(\pm\lambda/p)$) having a wavelength of "λ" obtained by diffraction grids (track) having a grid pitch "p". These diffracted lights and a zero-order transmitted light are light beams contributing to the image formation of the grid pitch "p". Generally, in order to form an image having the grid pitch "p" with sufficient contrast, it is determined that "θ" is sufficiently larger than "α".

Figure 9B:
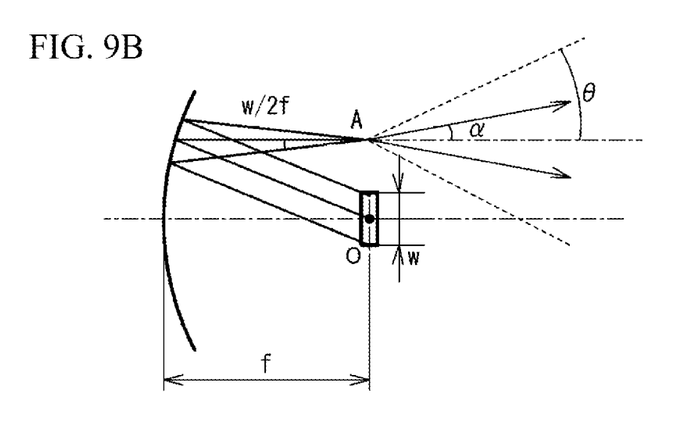

When the focal point O is off from the optical axis by "ε" in the vertical direction, an error of inclination (ε/f) of a light beam obtained by dividing the error "ε" between the focal point and the light source center by the focal length f from the light source to the partial paraboloid may occur in an incident angle to the substance A. In this case, the two diffracted lights of plus minus "α" illustrated in FIG. 9B are equally inclined. However, when the two diffracted lights are within the light-introducing angle plus minus "θ", these two diffracted lights contribute to the image formation if optical aberration caused by the inclination of the light beam is ignored.

In the above description, a virtual light source point without size perfectly coincides with the focus of the partial paraboloid. However, an actual light source has a limited size "w". Therefore, a light beams gets wider around an ideal parallel light. The widening angle is characterized as the number of apertures of the light source NAs=sin(w/2f) ("f" is a focal length of the partial paraboloid). Accordingly, an emitted light of the light source having a limited size around the focal point gets wider with a widening angle of w/2f. Therefore, in accordance with the angle, the allowable range of the error of the center position of the light source gets wider.

Figure 10:
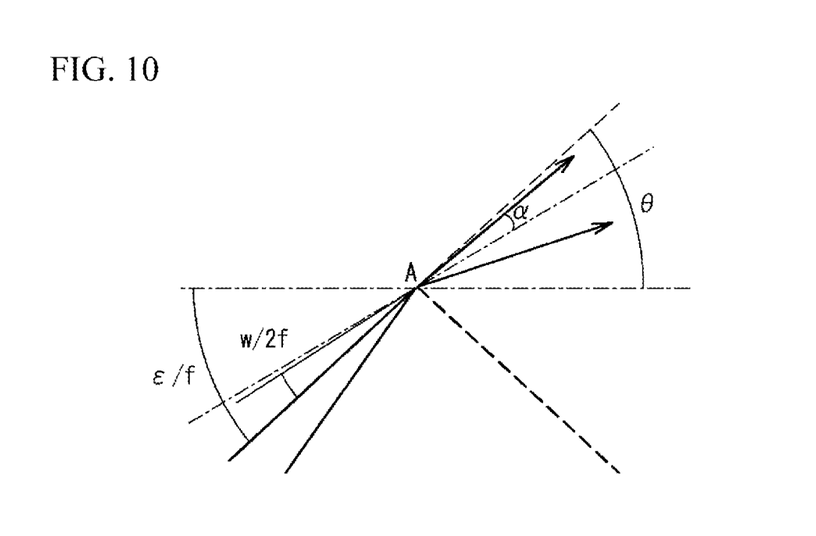
FIG. 10 illustrates the allowable range of the positional deviation between the focal point of the paraboloid and the light source.

Under a condition that a diffracted light contributing to the image formation is introduced into an image-forming system, a limitation allowed to the error "ε" of the center position of a light source is reviewed. FIG. 10 illustrates a limited relationship of light beams around the substance A, under a condition that an angle is exaggerated. From the left side of FIG. 10, the light beams are radiated with an inclination of ε/f and a widening angle of w/2f. The smallest inclination angle is ε/f−w/2f.

On the other hand, on the right side of the substance A, diffracted lights (sandwiched by ±α) contributing to the image formation are indicated within the light-introducing angle "θ". An angle of the light beam corresponding to the zero-order transmitted light is "θ−α". Therefore, in an approximation of which angle is sufficiently small, it is possible to obtain relationship of ε/f−w/2f≤θ−α, that is ε≤f(θ−α)+w/2(0≤θ−α). That is, an allowable range of the error "ε" of the center position of the light source is approximately w/2 that is half of a width of the light source in the strictest condition. It is thought that the allowable range increases on the basis of an allowance degree (θ−α) of the introducing angle of the image-forming system and the focal length "f" of the partial paraboloid.

It is not necessary to make correspondence between a center of the emission point of the light source and the focal point in the optical component of the embodiments. It is preferable that the positional error of the light source center satisfies the condition obtained from the above-mentioned approximate formulas.

Moreover, with respect to the structure of the illumination system, a bright field illumination directly introducing the zero-order transmitted light to the image-forming system is presupposed. However, a structure of a darkness field illumination detecting a scattered light from a substance or a structure using scattered illumination light by a diffusion board may be used for the component of the embodiments.

The present invention is not limited to the specifically disclosed embodiments and variations but may include other embodiments and variations without departing from the scope of the present invention.

What is claimed is:

1. A light-emitting unit comprising:
a light source; and
a reflector that has a reflection face of a first partial paraboloid and a reflection face of a second partial paraboloid, the first partial paraboloid and the second partial paraboloid being spaced from each other in an optical axis direction of the light source, the first partial paraboloid and the second partial paraboloid having a focal point on the light source,
wherein:
the second partial paraboloid is between the light source and the first partial paraboloid in the optical axis direction;
the second partial paraboloid has a coefficient that is different from that of the first partial paraboloid; and
the second partial paraboloid is positioned on a reflection direction side of a light from the light source that is reflected by the first partial paraboloid, with respect to a plane that is obtained on a presumption that the first partial paraboloid is extended to the light source side in accordance with the coefficient of the first partial paraboloid.

2. The light-emitting unit as claimed in claim 1, wherein:
the first partial paraboloid and the second partial paraboloid are expressed by $z+a=(x^2+y^2)/4a$ ($a>0$) when the optical axis direction is a Y-axis, a reflection direction of the first partial paraboloid and the second partial paraboloid is a Z-axis, an axis vertical to the Y-axis and the Z-axis is an X-axis, and a coefficient is "a"; and
the coefficient "a" of the second partial paraboloid is smaller than the coefficient "a" of the first partial paraboloid.

3. The light-emitting unit as claimed in claim 1, wherein:
the first partial paraboloid and the second partial paraboloid are expressed by $z+a=(x^2+y^2)/4a+c_i(x,y)$ ($a>0$) when the optical axis direction is a Y-axis, a reflection direction of the first partial paraboloid and the second partial paraboloid is a Z-axis, an axis vertical to the Y-axis and the Z-axis is an X-axis, and a coefficient is "a"; and
the coefficient "a" of the second partial paraboloid is smaller than the coefficient "a" of the first partial paraboloid.

4. A light-emitting and light receiving unit comprising:
a light emitting unit as claimed in claim 1;
a first light-receiving element that receives a light from the first partial paraboloid; and
a second light-receiving element that receives a light from the second partial paraboloid.

5. The light-emitting and light-receiving unit as claimed in claim 4, wherein:
the first partial paraboloid and the second partial paraboloid are expressed by $z+a=(x^2+y^2)/4a$ ($a>0$) when the optical axis direction is a Y-axis, a reflection direction of the first partial paraboloid and the second partial paraboloid is a Z-axis, an axis vertical to the Y-axis and the Z-axis is an X-axis, and a coefficient is "a"; and
the coefficient "a" of the second partial paraboloid is smaller than the coefficient "a" of the first partial paraboloid.

6. The light-emitting and light-receiving unit as claimed in claim 4, wherein:

the first partial paraboloid and the second partial paraboloid are expressed by $z+a=(x^2+y^2)/4a+c_i(x,y)$ (a>0) when the optical axis direction is a Y-axis, a reflection direction of the first partial paraboloid and the second partial paraboloid is a Z-axis, an axis vertical to the Y-axis and the Z-axis is an X-axis, and a coefficient is "a"; and the coefficient "a" of the second partial paraboloid is smaller than the coefficient "a" of the first partial paraboloid.

7. A photoelectric encoder comprising:

a light-emitting and light receiving unit as claimed in claim 4;

a first track that has optical grids along a measurement axis, relatively moves with respect to the light-emitting and light-receiving unit, and transmits a light from the first partial paraboloid; and a second track that has optical grids along the measurement axis, relatively moves with respect to the light-emitting and light-receiving unit, and transmits a light from the second partial paraboloid, wherein:

the first light-receiving element is arranged so as to receive a light passing through the first track; and the second light-receiving element is arranged so as to receive a light passing through the second track.

8. The photoelectric encoder as claimed in claim 7, wherein:

the first partial paraboloid and the second partial paraboloid are expressed by $z+a=(x^2+y^2)/4a$ (a>0) when the optical axis direction is a Y-axis, a reflection direction of the first partial paraboloid and the second partial paraboloid is a Z-axis, an axis vertical to the Y-axis and the Z-axis is an X-axis, and a coefficient is "a"; and the coefficient "a" of the second partial paraboloid is smaller than the coefficient "a" of the first partial paraboloid.

9. The photoelectric encoder as claimed in claim 7, wherein:

the first partial paraboloid and the second partial paraboloid are expressed by $z+a=(x^2+y^2)/4a+c_i(x,y)$ (a>0) when the optical axis direction is a Y-axis, a reflection direction of the first partial paraboloid and the second partial paraboloid is a Z-axis, an axis vertical to the Y-axis and the Z-axis is an X-axis, and a coefficient is "a"; and the coefficient "a" of the second partial paraboloid is smaller than the coefficient "a" of the first partial paraboloid.

10. A light-emitting unit comprising:

a first light source and a second light source; and a reflector that has a reflection face of a first partial paraboloid and a reflection face of a second partial paraboloid, the reflection face of the first partial paraboloid having a focal point on the first light source, the reflection face of the second partial paraboloid having a focal point on the second light source;

wherein:

the first partial paraboloid and the second partial paraboloid are spaced from each other in an optical axis direction of the first light source;

the second partial paraboloid is between the first light source and the first partial paraboloid in the optical axis direction of the first light source;

the second partial paraboloid has a coefficient that is different from that of the first partial paraboloid; and the second partial paraboloid is positioned on a reflection direction of a light from the first light source that is reflected by the first partial paraboloid, with respect to a plane that is obtained on a presumption that the first partial paraboloid is extended to the first light source side in accordance with the coefficient of the first partial paraboloid.

* * * * *